INVENTORS.
MALCOLM M. DONALDSON
ADOLPH R. MORRIS
BY

ATTORNEY

United States Patent Office 3,428,478
Patented Feb. 18, 1969

3,428,478
HYDROPHOBIC ORGANIC FILM COATED WITH A POLYOL-POLYMETHYLOLAMIDOGEN CONDENSATE AND PROCESS FOR PREPARATION OF SAID FILM
Malcolm Macfarland Donaldson, Bedford Village, N.Y., and Adolph Roy Morris, South Norwalk, Conn., assignors to American Cyanamid Company, Stamford, Conn., a corporation of Maine
Continuation-in-part of application Ser. No. 374,618, June 12, 1964. This application Feb. 25, 1966, Ser. No. 536,525
U.S. Cl. 117—73          23 Claims
Int. Cl. B44d *1/22;* C08j *1/44*

ABSTRACT OF THE DISCLOSURE

Hydrophobic organic film possesses improved adhesion for topcoat material and improved heat sealing properties, when it carries a coating of an at least partially thermoset polyol-polymethylolamidogen condensation product. The coating is a condensation product of a polyol having a molecular weight in excess of 2,000 with a material selected from the group consisting of the polymethylolamidogens and lower alkyl ethers thereof. The ratio of the number of hydroxyl substituents of the polyol to the sum of the hydroxyl substituents and etherified hydroxyl substituents of the amidogen is between 1:0.5 and 1:5.

---

This is a continuation-in-part of our copending application Serial No. 374,618 filed on June 12, 1964, and now abandoned.

This invention relates to normally coating-receptive hydrophobic organic film which possesses improved adhesion for organic inks, adhesives, protective films, foils, and other topcoat material as the result of a special resinous coating thereon. The invention includes such film substrate with and without topcoat material thereon, and processes for the application of the special resinous coating.

At the present time hydrophobic organic film (polyethylene, polypropylene, polystyrene, polyvinyl chloride, polyvinylidene chloride, nylon, polyethylene terephthalate, etc.) is produced on a large commercial scale chiefly for use as a wrapping and packaging material, but each species of film now produced lacks at least one property (generally heat-sealability or impermeability to oxygen, water vapor, etc.) necessary to make it fully useful. It is general practice, consequently, to coat or "topcoat" any given film with another film (which may be a metal foil) so as to create a composite film having all of the desired properties. While in some instances the topcoat is applied as a self-adhesive hot melt, it is more common to apply the topcoat as a solution or emulsion.

Hydrophobic organic film, as manufactured, possesses poor affinity for topcoat material and in certain instances for example polyethylene, polypropylene and polystyrene has been generally regarded as possessing no affinity at all for topcoat material. It has become customary to subject such film to an oxidizing treatment to render the surface of such film coating receptive, but film which possesses greater affinity for topcoat materials is greatly desired.

The discovery has now been made that in preferred instances hydrophobic organic film which carries an anchor coating of an at least partially thermoset condensation product of a polyol having a molecular weight in excess of 2,000 with a polymethylolamidogen (or lower alkyl ether thereof) possesses greatly improved affinity for topcoat material when the ratio of the hydroxyl substituents of the polyol to the total number of the hydroxyl substituents and etherified hydroxyl substituents in the polymethylolamidogen and lower alkyl ether thereof is between 1:0.5 and 1:5. (For convenience, the above-described condensation product will generally hereinafter be referred to as a "polyol-polymethylolamidogen" condensate.)

In preferred instances, as determined by improvement in heat-sealability, the strength of the bond between the topcoat and the substrate film is more than doubled.

When the coating is of anchoring thickness, the receptivity of the film for hydrophobic organic material is greatly improved. When the coating is of topcoat thickness, the film is greatly improved as to heat-sealability and the separate application of heat-sealing topcoat material becomes unnecessary.

In addition, hydrophobic organic film carrying a coating of a polyol-polymethylolamidogen condensate possesses the following beneficial properties.

(1) The film coated with the polyol-polymethylolamidogen condensate has the same or better gloss, transparency, strength and flexibility as the film without the coating.

(2) The strong anchoring properties of the polyol-polymethylolamidogen condensate are not significantly harmed by exposure to moisture. Topcoat material can therefore be applied to the film in aqueous emulsion state, and inflammable solvents are not needed.

(3) Film carrying the polyol-polymethylolamidogen condensate in cured state is non-tacky at room temperature. Such film consequently can be formed into a roll, and the roll can be transported (or stored) and then unwound. The film can thus be manufactured in one place and topcoated in another.

(4) The film is rapidly and substantively dyed by acid dyes in aqueous solution. Most synthetic organic film cannot be dyed in this manner.

Film according to the present invention is more particularly illustrated by the drawings, wherein.

In each figure, 1 designates as substrate a hydrophobic organic film (or other shaped structure), at least one surface of which is coating-receptive as is shown by stippling 2.

Figure 1:
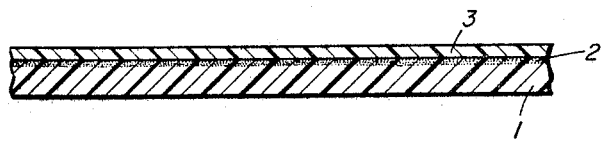
FIGURE 1 is a schematic vertical section of hydrophobic organic film, one surface of which carries tiecoat of a polyol-polymethylolamidogen condenate in at least partially thermoset state.
Figure 2:
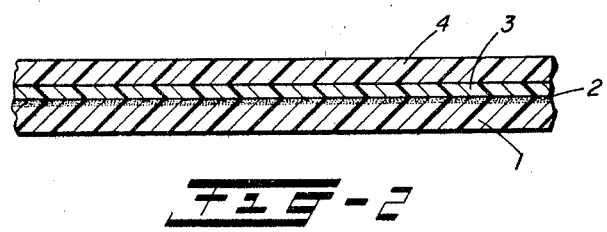
FIGURE 2 is a schematic vertical section of the anchor coated film of FIGURE 1 carrying a topcoat.
Figure 3:
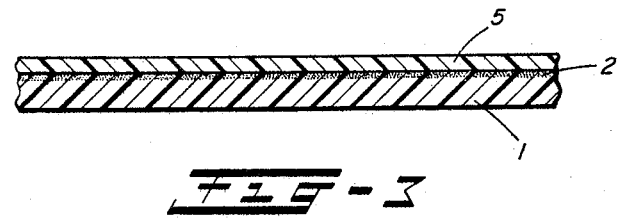
FIGURE 3 is a schematic vertical section of hydrophobic organic film which carries thereover a self-anchoring coating of a polyol-polymethylolamidogen resin to topcoat thickness in thermoset state.

In FIGURES 1 and 2, 3 designates a coating of tiecoat thickness of a polyol-polymethylolamidogen resin in uncured or in partially or completely thermocured state. The tiecoat directly overlies coating-receptive surface 2.

In FIGURE 2, 4 designates a topcoat applied over and in direct contact with tiecoat 3.

In FIGURE 3, 5 designates a coating of topcoat thickness of a polyol-polymethylolamidogen resin applied over and in direct contact with coating-receptive surface 2 of film substrate 1, to which it is self-anchoring.

The polyol-polymethylolamidogen, as it cures, passes through two important stages.

The first stage is that wherein the condensate is adhesive or tacky at room or at elevated temperature. In that stage hydrophobic organic film or metallic foil may be pressed upon the tacky coating which holds the film or foil. If desired, the composite can be subjected to heat and pressure, causing the condensate to pass into cured state.

The second stage commences when the condensation product leaves the first stage. In the second stage the condensation product, having been cured, is hard, glossy, and non-tacky at room temperature. Film carrying the polymer in that state can be rolled, stored or shipped, and then unrolled and topcoated. Film with the anchor coat in this state is suitable for sale.

In the film coating art the term "anchor coat" or "tie-coat" designates a coating which is sufficiently thick to impart to the surface of the film improved affinity for topcoat material yet which is sufficiently thin that the coating does not impart to the film the identifying characteristics of the anchoring material itself. Tiecoats therefore are generally 1/100,000″ thick or even thinner, as calculated from their weight (typically ½ to 3 oz. per 1000 ft.[2] of film surface).

Topcoats are coatings of hydrophobic organic material (or of metal foil) which are sufficiently thick to provide the film with a surface of different physical or chemical character. They are customarily about 1/10 mil thick and may be much thicker.

The film benefited by the present invention is any hydrophobic synthetic organic film the surface of which is at least slightly coating receptive, i.e., receptive to hydrophobic organic topcoat material. Nylon film, polyvinyl chloride film, polycarbonate film, polyvinylidene chloride film, polyvinyl acetate film, 85% hydrolyzed polyvinyl acetate film (polyvinyl alcohol film) and polyethylene terephthalate film inherently possesses significant receptiveness for such coating materials and other film (such as polyethylene film, polypropylene film and polystyrene film) can be rendered coating receptive by treatment with an oxidizing acid, by exposure to a flame, or by passage through an electric corona discharge; cf. U.S. Patents 2,910,723, 3,061,882, 3,067,119 and 3,111,418.

The polyols present in the polyol-polymethylolamidogen compositions employed in the present invention have a comparatively high molecular weight. Their molecular weight is at least 2,000. The condensation products of lower molecular weight polyols with polymethylolamidogens under normal film-drying conditions do not possess significant anchoring properties. The preferred polyols are hydroxyl-containing alkyd resins, hydroxyl-containing vinyl polymers, or naturally-occurring polyols such as starch. The polyols contain at least two etherifiable hydroxyl groups per macromolecule. They preferably contain more, to facilitate or accelerate reaction of the polyols with the amidogen.

In the case of vinyl polymers, which generally have molecular weights above 50,000, best results appear to have been obtained when the average macromolecule contains 50 to 500 etherifiable hydroxyl substituents whereas in the case of the soluble alkyd resins, which necessarily have a lower molecular weight, 3 to 10 hydroxyl groups per macromolecule seem sufficient for vary satisfactory results.

The polyols which are employed in the invention may be soluble in water, in dilute acid or base, or in any of the common volatile solvents. However, any polyol can be used which is emulsifiable in water or in organic medium. Suitable alkyd resins are sold commercially under the names: Rezyl resins 92–5 and 99–5 (Koppers Chemical Co.) and Beckasol 1308 (Reichold Chemical Co.). Suitable vinyl polymers can be made by copolymerizing such a material as 2-hydroxyethyl acrylate, allyl alcohol or di - 2 - hydroxyethylaminoethyl acrylate with one or more vinyl monomers copolymerizable therewith capable of acting as spacers for the hydroxyl-containing component or components, for example, acrylic acid; ethyl acrylate; acrylonitrile; dimethylaminoethyl acrylate, styrene and vinylnaphthalene.

The polymethylolamidogens [or poly(methoxy) methylamidogens] with which the above-described polyols are reacted in forming the coatings on film of the present invention are nitrogenous compounds which carry at least two methylol substituents as such or in etherified state. Suitable polymethylolamidogens are dimethylol urea, dimethylol thiourea, dimethylolguanidine, trimethylol biuret, dimethylol dithiobiuret, trimethylol formoguanamine, dimethylol acetoguanamine, polytrimethylol melamine, polymethoxymelamine and low polymers of these polymethylolamidogens. It is preferred to use such compounds and low polymers in the form of their lower alkyl (methyl, ethyl, propyl, isopropyl, butyl) ethers because such ethers generally possess better solubility in water and in certain volatile organic solvents, and react more easily with the above-described polyols.

In general, we prefer that the amidogen contain as many alkoxymethyl substituents as is practically possible, because then the rate at which the hydroxy substituents of the polyol are etherified is accelerated and a harder polymer is formed in shorter time.

The film of the present invention is prepared by coating a desired hydrophobic organic film with a fluid liquid dispersion of a mixture of a polyol having a molecular weight in excess of 2,000, a polymethylolamidogen or a lower alkyl ether thereof [a poly(alkoxy)alkylamidogen], and an acid catalyst for accelerating reaction between the polyol and the amidogen. The components are proportioned so that there are 0.5 to 5 hydroxyl equivalents (methylol or alkoxymethyl substituents) in the amidogen per etherifiable hydroxy group in the polyol.

The temperature at which the condensate becomes tacky is also determined by the amount of curing to which the condensate has been subjected. It is thus often desirable to terminate the heating before the amidogen has completely reacted with the polyol, so that film having a lower tack point is obtained than would otherwise be the case. The resulting film can be top-coated with a film or foil of top-coat material, after which the resulting laminate can be heated so as to cause substantially all of the amidogen to pass into reacted state.

The polyol and the amidogen may be applied to the film in any convenient way. Thus in instances where the polyol and the amidogen are both soluble in a volatile liquid, it will generally be found most convenient to apply them as solutions in the liquid in which they are both most easily soluble. Where they are both water-soluble, they may be applied in organic solvent solution and when one is soluble and the other component is not soluble, the insoluble component may be applied in emulsified state in the fluid medium in which the other component is dissolved. The acid catalyst should be preferably an agent which is soluble in the liquid phase of the composition. The coating composition may be applied to the film by air knife, doctor blade, offset roll, gravure roll, or other convenient manner. The compositions may contain such materials as are commonly present in film coatings for example, dyes, pigments, and ultra-violet light absorbers.

The compositions are dried and the components of the composition are interracted and thermoset by heating the film in any convenient way (in an oven, on hot rolls, by infra-red radiation, etc.) to a safe temperature above 50° C. and preferably above 100° C., until the components have thermoset to desired extent. Complete thermosetting generally occurs in less than 1 minute in the range 100° C.–130° C.

Thereafter the film is topcoated with any desired topcoat material.

Amongst those topcoats which may be applied are cellulose acetate, Saran, methyl cellulose, polyethylene, deacylated chitin, rubber, chlorinated rubber, printing ink, rubber hydrochloride, ethyl cellulose, butyl methacrylate, moisture-resistant lacquers, including nitrocellulose and butylated urea-formaldehyde lacquer wares such as montan wax, bee's wax and carnauba wax, and other film-forming water-proofing materials. The topcoat is not necessarily a continuous film, and may and often does consist of printed legends, revenue stamps, or decorative matter. The topcoat may be hydrophilic and may be mucilage, or may be a foil of aluminum tin, copper or other maleable metal.

The most advantageous topcoat at the present time is one which renders the film heat-sealing and which enhances its vapor barrier characteristics. For these purposes vinylidene chloride copolymers (Saran) are particularly advantageous. Among these are copolymers of a major amount of vinylidene chloride with a minor amount of acrylonitrile or similar hydrophobic component such as for example methyl methacrylate and vinyl acetate. The topcoat can be applied in any convenient state (i.e., as a solution or emulsion, as a hot melt, or as a preformed film or foil). When the topcoat is applied in solution or emulsion state, the film is dried in the manner described above, and drying of the topcoat solution or emulsion in certain instances can be combined with completion of the drying of the tiecoat.

The invention is further illustrated by the examples which follow. These examples illustrate preferred embodiments of the invention and are not to be construed in limitation thereof.

POLYOLS

The following illustrates a variety of polyols suitable for reaction with poly(alkoxymethyl)amidogens to form cross-linked resins which act as tiecoats on hydrophobic organic film.

Polyol A (tetrahydrophthalic anhydride-adipic acid-neopentyl glycol-trimethylolethane resin). This illustrates a resin of the water-insoluble, toluene-soluble type.

Into a flask are charged 1900 g. of tetrahydrophthalic anhydride (12.5 mol), 185 g. of adipic acid (1.25 mol), 1430 g. of neopentyl glycol (13.75 mols), and 200 g. of trimethylol ethane (1.65 mol). The mixture is heated at 160° C. for two hours and then at 225° C. until it reaches an acid number of 5 (about 16 hours). The weight average molecular weight of the resin is about 4,000–5,000 (calculated from its acid number) and the resin contains about seven OH groups per macromolecule. The resin has a pour point of 100°–110° C. and is soluble in toluene and ethyl acetate, but is not soluble in water.

Polyol B (tetrahydrophthalic anhydride-dimerized linoleic acid-pentanediol-trimethylol ethane resin). This illustrates another resin of the water-insoluble, toluene-soluble type.

Into the flask used above is placed 1900 g. of tetrahydrophthalic anhydride (12.5 mols), 750 g. of dimerized linoleic acid (1.25 mols), 1430 g. of 1,5-pentanediol (13.75 mols), and 200 g. of trimethylol ethane (1.65 mols).

The materials are reacted by the procedure used for the preparation of polyol A. The weight average molecular weight of the resin is about 4,000–5,000 and the resin contains about five OH groups per macromolecule.

The resin is soluble in toluene and ethyl acetate, but not in water.

Polyol C (tetrahydrophthalic anhydride-adipic acid neopentyl glycol "Carbowax"-trimethylolethane resin). This illustrates a resin of the water-soluble type.

Into a four-necked flask equipped with stirrer, thermometer, nitrogen inlet and condenser are charged 1900 g. (12.5 mol) of tetrahydrophthalic anhydride, 185 g. (1.25 mol) of adipic acid, 1222 g. of neopentyl glycol (11.75 mol) and 200 g. (1.61 mol) of trimethylolethane. The mixture is heated to 160° C. over one hour, maintained at 160° C. for one hour, heated to 225° C. over 4 hours, and maintained at 225° C. until the mixture reaches an acid number (phenolphthalein end-point) of 4.5. During the heating, when the acid number of the reaction mixture is about 40, there are added 500 g. (0.3 mol) of "Carbowax" (polymerized ethylene oxide) of a molecular weight of 1450, and 500 g. (1.7 mol) of "Carbowax" of molecular weight of 300, and the components are reacted to an acid number between 5 and 7. The product is cooled to room temperature.

The weight average molecular weight of the product is about 4,000–5,000 and the resin contains about six OH substituents per macromolecule.

The resin is soluble in water (forming an opalescent solution therewith), and in ethyl acetate.

Polyol D (tetrapropenylsuccinic anhydride-dimerized linoleic acid-neopentyl glycol-trimethylolethane resin). Into the flask used above are charged 665 g. (2.5 mol) of tetrapropenylsuccinic anhydride, 150 g. of dimerized linoleic acid (0.25 mol), 288 g. of neopentyl glycol (2.75 mol), and 40 g. of trimethylol ethane (0.33 mol).

The mixture is reacted by the procedure shown above to an acid number of 5. The resin is soluble in toluene and ethyl acetate.

The weight average molecular weight of the resin is about 4,000–5,000 and the resin contains about five OH groups per macromolecule.

Polyol E (fumaric acid-sebacic acid-diethylene glycol-glycerol resin). Into the flask used for the preparation of polyol A are charged 116 g. (1 mol) of fumaric acid, 808 g. (1 mol) of sebacic acid, 530 g. (5 mols) of diethylene glycol, and 92 g. (1 mol) of glycerol.

The materials are reacted as shown for polyol A.

The resin is soluble in methyl ethyl ketone. The weight average molecular weight of the resin is about 4,000–5,000 and the resin contains about 2.5 OH groups per average macromolecule.

Polyol F. Made in the same manner as polyol A, except that 1450 g. of the tetrahydrophthalic anhydride is replaced by 1450 g. of isophthalic acid.

Polyol G (2-hydroxyethyl methacrylate-ethyl acrylate-styrene-acrylic acid interpolymer). A 5-liter flask equipped with a stirrer, a thermometer, a reflux condenser, and two addition funnels is charged with 1276 cc. of water, 5 g. of sodium lauryl sulfate, and 7.5 g. of sodium bicarbonate. A mixture of 136 g. of 2-hydroxyethyl methacrylate, 544 g. of styrene, and 310 g. of ethyl acrylate and 10 g. of acrylic acid monomers is placed in one addition funnel and the catalyst (5 g. of ammonium persulfate in 220 cc. of water) is placed in the other. The mixture is heated to 90° C. and 10% of the catalyst solution is added thereto. All of the monomeric mixture and 80% of the catalyst solution are slowly, separately and uniformly allowed to flow into the flask over 90 minutes; the temperature of the reaction mixture is maintained at 90° C. When flow of the monomeric solution into the flask is complete, the remaining 10% of the catalyst solution is added and the temperature of 90° C. is maintained for 30 minutes. The product is a white fluid latex which is cooled to room temperature and neutralized to pH 8–8.5 with ammonium hydroxide. To this latex is added 25 g. of a 40% by weight solution of ammonium methanesulfonate. The latex contains 40% polymer solids.

The resulting polymer has an estimated molecular weight of 200,000, so that on the average each molecule contains about 200 hydroxy substituents. These substituents are readily etherifiable with alkoxymethyl amidogens.

Polyol H (glycerol-phthalic anhydride resin). In a round-bottomed flask equipped with stirrer and heater, a mixture of 92 g. (1 mol) of glycerol, 166 g. (1 mol) of phthalic anhydride and 111 g. (0.55 mol) of lauric acid is heated slowly to 225° C. and maintained at this temperature under an inert atmosphere until an acid number of less than 10 or a viscosity of about Z (Gardner-Holdt) is obtained. The reaction mixture is then cooled and cut to 60% solids with xylene.

Polyol I (isophthalic acid-tetrahydrophthalic anhydride-adipic acid-neopentyl glycol-trimethylol ethane resin). A mixture of 9.4 mols of isophthalic acid, 3.1 mols of tetrahydrophthalic anhydride, 1.3 mols of adipic acid, 12.5 mols of neopentyl glycol and 1.7 mols of trimethylol ethane is heated under nitrogen until melted, maintained at 180° C. for 2 hours and then at 230° C. until an acid number of 15 is reached. The reaction mixture is added with stirring to 3200 ml. of water at 55° C. containing 45 g. of 29% NH₄OH and heated to 90° C. To the dispersion is slowly added first 800 g. of isopropyl alcohol and then 2000 ml. of water.

The ratio of OH groups in the polyols to the —COOH groups in the acids is 30.1:27.2, equivalent to 1.1:1.

Polyol J. This is the same as polyol A except that 75% by weight of the tetrahydrophthalic anhydride is replaced by isophthalic acid. The resulting polymer is harder and permits formation of non-blocking tiecoats.

Polyol K. Boiled paper-coating starch ("Stayco M").

Polyol L. Hydroxyethyl cellulose (water-soluble grade).

AMIDOGENS

The following illustrates thermosetting polyalkoxymethyl amidogens suitable for use in the practice of the present invention. All are water-soluble.

(1) Hexakis (methoxymethyl) melamine, or low polymer thereof. Prepared by method of Example 1 of U.S. Patent No. 2,345,543.

(2) Tri(methoxymethyy)trimethylmelamine, or low polymer thereof. Prepared by method of Example 1 of U.S. Patent No. 2,345,543.

(3) Di(methoxymethyl)urea, or low polymer thereof.

(4) 2,5-di(methoxymethyl)uron, or low polymer thereof.

(5) Tetrakis (methoxymethyl)stearoguanamine.

(6) N,N'-di(methoxymethyl)adipamide.

(7) Tris(methoxymethyl)tris[4,6-diamino-s-triazine)-2-ylamino]ethyl phosphine oxide. Prepared by reacting (4,6-diamino-s-triazine-2-ylamino)ethyl phosphine oxide (disclosed and claimed in copending application Serial No. 497,539 filed on October 18, 1965, now U.S. Patent 3,364,216 by Gerald A. Johnson) with formaldehyde at pH 9.5 and methylating by heating with methanol at pH 2.

(8) Pentakis(methoxymethyl)melamine.

COATING COMPOSITIONS

The following illustrates the preparation of fluid aqueous and non-aqueous compositions suitable for producing tiecoats in the manufacture of film according to the present invention. The polyols and amidogen-aldehyde condensation products used for the preparation of these compositions are those described above.

These compositions are strongly adherent to hydrophobic organic film and in several instances they impart good heat-sealing properties when present in topcoat thickness. These topcoats consequently possess the valuable property of being self-anchoring to the film.

Composition I.—Polyol A-amidogen 1

Into 30 g. of ethyl acetate at room temperature, 54.0 g. of polyol A at room temperature is slowly dissolved. To the resulting solution at room temperature is added 6 g. of hexakis(methoxymethyl)melamine (amidogen 1), followed by 10 g. of 6% sulfuric acid dissolved in methanol.

The resulting solution has a viscosity of 8 stokes and a resin solids content of 60% by weight. The ratio of hydroxyl groups in the polyol to the methylol groups (as methoxymethyl) groups in the amidogen is 1:1.

The above-described resin has the properties of acting as (1) a tiecoat for hydrophobic organic topcoat material and (2) a topcoat which is both self-anchoring to oxidized polyalkylene surfaces and which heat-seals strongly to itself.

Composition II.—Polyol B-amidogen 1

To 40.0 g. of polyol B at 130° C. is slowly added 60 g. of toluene at room temperature with stirring, and into this is blended first 8 g. of hexakis(methoxymethyl) melamine in 12 g. of toluene and 0.32 g. of p-toluenesulfonic acid in 3 g. of isopropanol.

The ratio of the hydroxyl groups of the alkyd resin to the methylol (i.e., methoxymethyl) groups of the amidogen is 1:1.3.

Composition III.—Polyol C-amidogen 1

To 1596 cc. of water at 60° C. containing 0.1% by weight of sodium dioctyl sulfosuccinate are added with rapid stirring 480 g. of solid molten polyol C at 50° C. and then 120 g. of hexakis(methoxymethyl)melamine. The resulting viscous solution is promptly cooled to room temperature. To this is added a solution of 12 g. of p-toluene-sulfonic acid in 30 cc. of water neutralized to pH 7.5 with N-methyl-morpholine. The resulting solution is non-viscous and has a pH of 7 and contains 26.5% solids. The molar ratio of the hydroxyl groups in the polyol C to the methoxymethyl (i.e., methylol) groups of the amidogen is 1:1.3.

Composition IV.—Polyol D-amidogen 1

To 40.0 g. of polyol D at 130° C. are slowly added with stirring first 60.0 g. of toluene at 20° C., 10 g. of hexakis(methoxymethyl)melamine in 15 g. of toluene and finally 0.1 g. of p-toluenesulfonic acid in 1 g. of isopropanol.

The ratio of the hydroxyl groups of the alkyd resin to the methylol (i.e., hydroxymethylol) groups of the amidogen is 1:1.3.

Composition V.—Polyol E-amidogen 1

To 80 g. of polyol E dissolved in 50 g. of toluene is added 20 g. of amidogen 1 and 0.2 g. of toluenesulfonic acid dissolved in butanol. The mixture is warmed and is stirred until a uniform solution is obtained.

Composition VI.—Polyol F-amidogen 1

The procedure for the preparation of composition I is repeated except that polyol F is employed in place of the polyol A.

Composition VII.—Polyol A-amidogen 2

The procedure for the preparation of composition I is repeated except that the amidogen 1 employed in that composition is replaced by 9.3 g. of amidogen 2 [tri-(methoxymethyl)trimethylmelamine].

Composition VIII.—Polyol A-amidogen 3

The procedure for the preparation of composition I is repeated except that the hexakis(methoxymethyl)-melamine employed therein is replaced by 6.8 g. of amidogen 3 [1,3-di(methoxymethyl)urea].

Composition IX.—Polyol A-amidogen 4

The procedure for the preparation of composition I is repeated, except that the hexakis(methoxymethyl)-melamine is replaced by 8.8 g. of amidogen 4 [2,5-di(methoxymethyl)uron].

In compositions VII, VIII and IX, the ratio of the number of —OH groups in the polyol to the CH₂OCH₃ groups in the amidogen is 1:1.

Composition X.—Polyol A-amidogen 5

To 80 g. of polyol A is added 50 g. of toluene, 20 g. of amidogen 5 [tetrakis(methoxymethyl)stearoguanamine] and 0.8 g. of p-toluenesulfonic acid in butanol. The mixture is warmed and stirred until a solution is obtained.

Composition XI.—Polyol A-amidogen 6

A 10% by weight solution of polyol A in ethyl acetate is prepared and to this is added 13.3% of amidogen 8 [tetrakis(methoxymethyl)adipamide] based on the weight of polyol A, and 10% based on the weight of amidogen 8 of sulfuric acid in n-butanol as catalyst. The mixture is stirred at room temperature; a clear solution forms.

Composition XII.—Polyol G-amidogen 9

Into 200 g. of the polyol G latex described above is dissolved 20 g. of pentakis(methoxymethyl)melamine.

Composition XIII.—Polyol H-amidogen 9

Into 100 g. of polyol H (60% xylene solution) is stirred 6 g. of amidogen 9, and 0.5 g. of $H_2SO_4$ is added as catalyst.

Composition XIV.—Polyol K-amidogen 1

To a 5% solution of 80 g. of polyol K in water is added 20 g. of amidogen 1 and 2.0 g. of ammonium methanesulfonate.

(MEK), ethyl acetate (EtAc) or as an emulsion in water, by a No. 12 Mayer rod to give coatings of topcoat thickness.

Adhesion of the topcoat to the polyethylene film is determined by applying to the film 3″ of a 6″ long strip of adhesive cellulose tape 1″ wide ("Scotch" tape), and ripping the tape from the film. Adhesion is satisfactory ("O.K.") if the topcoat remains attached to the film.

Adhesion of the topcoat to the polypropylene film is determined by standard heat seal test.

Results are as follows and are shown in comparison with the results which are obtained with controls which contain none of the polyol-amidogen resin.

| Run No. | Film | Topcoat composition | | | Heat seal test [2] grams/inch | | Topcoat adhesion [4] | |
|---|---|---|---|---|---|---|---|---|
| | | VC:AN [1] ratio | Percent copol. | Solvent [1] | No tiecoat [3] | With tiecoat | No tiecoat [3] | With tiecoat |
| 1 | PE | 90:10 | 10 | THF | | | N.G. | O.K. |
| 2 | PE | 85:15 | 15 | MEK | | | N.G. | O.K. |
| 3 | PE | 90:10 | 60 | Water | | | N.G. | O.K. |
| 4 | PP | 90:10 | 10 | THF | 300 | 600 | | |
| 5 | PP | 90:10 | 20 | THF | 200 | 600 | | |
| 6 | PP | 85:15 | 15 | MEK | 150 | 700 | | |
| 7 | PP | 90:10 | 60 | Water | 10 | 700 | | |

[1] For abbreviations, see text above.
[2] Sealed under 20 lb./in.² pressure at 275° F. for 1 second (by "Sentinal" heat sealer).
[3] Controls.
[4] By adhesive tape test.

Composition XV.—Polyol L-amidogen 1

To a 5% solution of 80 g. of polyol L in water is added 20 g. amidogen 1 and 2.0 g. of ammonium methanesulfonate.

Composition XVI.—Polyol I-amidogen 1

To polyol I at 55° C. is added 272 of hexakis(methoxymethyl)melamine, after which the pH of the resulting mixture is adjusted to 8.4 by addition of ammonium hydroxide.

Example 1-A

The following illustrates polyalkylene films having coating-receptive surfaces carrying a coating of a polyol cross-linked through some of its hydroxy substituents by a poly(methoxymethyl)amidogen.

Coating composition I [polyol A plus hexakis(methoxymethyl)melamine] is diluted to 10% solids with ethyl acetate and is coated on samples of surface-oxidized polyethylene (PE) film and polypropylene (PP) film [commercial films respectively sold under the designation "Zendel" (Union Carbide Co.) and "Profax B-502" (Hercules Powder Co.)] by use of a No. 3 Mayer rod.

A Mayer rod is a steel rod ¼″ in diameter wound with wire of designated number; the number of the wire is the identifying number of the rod.

The coating is applied by pouring a quantity of the coating composition on the film and rolling a Mayer rod over the film so as to remove all of the composition which does not pass under the rod. The thickness of the coating is a function of the thickness of the wire with which the rod is wound, the lower the number of the rod, the thinner is the wire and the thickness of the coating. The weight of the coating formed by applying a 10% by weight solution to the composition of the film by a No. 3 Mayer rod and drying the coating is about 1 ounce per 1000 ft.², equivalent to a thickness of about 0.01 mil.

The film is dried for 30 seconds at 100° C. and is nontacky when stored 24 hours at room temperature under 1 lb./in.² pressure. The resin at this point is substantially insoluble in toluene at room temperature.

The sheets are now topcoated with vinylidene chloride-acrylonitrile (VC:AN) copolymer of the composition shown in the table below. The topcoat is applied as a solution in tetrahydrofuran (THF), methyl ethyl ketone

Example 1-B

The above general procedure is repeated except that the polyalkylene films are replaced by the films shown in the table below, and the top coat is an 85:15 molar ratio vinylidene chloride:acrylonitrile copolymer applied as a 15% by weight solution in methyl ethyl ketone. Results are as follows:

| Run No. | Film | Heat seal test [1] grams/inch | | Topcoat adhesion [1] | |
|---|---|---|---|---|---|
| | | No tiecoat | With tiecoat | No tiecoat | With tiecoat |
| 8 | Cellulose acetate | | | N.G. | O.K. |
| 9 | Polyethylene terephthalate [2] | 200 | 400 | N.G. | Fair. |
| 10 | Nylon [2] | 100 | 600 | N.G. | O.K. |
| 11 | Polystyrene [3] | | | N.G. | O.K. |

[1] For abbreviations and test see text and table above.
[2] Conditioned by 2-second dip in 2% sulfuric acid to neutralize surface alkalinity.
[3] Surface-oxidized and thereby made coating receptive by passage through corona discharge.

Example 2

The following illustrates the preparation of polyalkylene film according to the present invention carrying an adhesive tiecoat and the application of a film topcoat thereto so as to form a laminate.

Coating-receptive (surface-oxidized) polypropylene film ("Udel," made by Union Carbide Chemical Co.) is coated with a 10% by weight solution of coating composition I by the method of Example 1, using a No. 6 Mayer rod, and the film is dried 10 seconds at 100° C. The resulting film is tacky.

Cellulose paper is pressed upon the film under 60 lb./in.² pressure and the resin is thermoset by heating 6 seconds at 275° F. The paper remains tightly adherent when subjected to a strong pull. A heavier pull splits the paper half remaining attached to the film.

The procedure is repeated using aluminum foil instead of the regenerated cellulose film. After the test the aluminum remains adherent to the polyethylene substrate.

Example 3

The following illustrates the affinity for topcoat material of coating-receptive (surface oxidized) polypropylene film which has been treated by application of a mixture in aqueous dispersion of a polyol and a reactive amidogen, followed by reaction of the materials on the film to form the anchor resin.

A 10% by weight aqueous dispersion of tiecoat composition II [a mixture of tetrahydrophthalic anhydride-adipic acid-neopentyl glycol-"Carbowax"-trimethylolethane resin and hexakis(methoxymethyl)melamine] is applied to coating-receptive (surface oxidized) polyethylene film similar to that of Example 1 by the use of a No. 3 Mayer rod, and the wet coated film is dried in an oven at 100° C. for 3 minutes. The components co-react to form a resin which is toluene insoluble. "Carbowax" is a high molecular weight ethylene oxide homopolymer.

The film is then topcoated with the vinylidene chloride-acrylonitrile copolymer shown in the table below, applied by Mayer rod as solutions in organic solvents (runs 1 and 2) or as an emulsion in water (run 3). The samples are dried at 100° C., after which the heat-sealing properties of the resulting composite film are determined. Results are as follows:

| Run No. | Topcoat | | | Heat seal test grams/inch [6] | |
|---|---|---|---|---|---|
| | VC:AN ratio [1] | Composition | | No tiecoat | With tiecoat |
| | | Percent copol. [2] | Solvent | | |
| 1 | 90:10 | 10 | THF [3] | 200 | 500 |
| 2 | 85:15 | 10 | MEK [4] | 150 | 700 |
| 3 | 90:10 | 60 | Water [5] | 10 | 450 |

[1] Vinylidene chloride:acrylonitrile molar ratio in copolymer.
[2] Based on weight of solution or emulsion.
[3] Tetrahydrofurane.
[4] Methyl ethyl ketone.
[5] Copolymer is in emulsified state.
[6] To pull heat-sealed film apart. Sealed by method of Example 1.

Example 4

The following illustrates the preparation and heat-sealing properties of polypropylene film carrying a coating of topcoat thickness of a polyol-polymethoxymethyl amidogen resin.

Coating composition I (a mixture of polyol A and hexakis(methoxymethyl)melamine) is diluted to 10% solids by addition of ethyl acetate and is applied to coating-receptive (surface-oxidized) polypropylene film by the method of Example 1 using a No. 12 Mayer rod. The film is dried 1 minute at 100° C. The film yields a heat seal test of 1,500 g. per mol when tested by the method of Example 1.

Example 5

The following illustrates oxidized polyethylene carrying a tiecoat composed of a mixture of a polyol-poly(methoxymethyl)amidogen condensate and a vinylidene copolymer.

Solution II [polyol B plus hexakis(methoxymethyl)-melamine] is diluted to 10% solids by addition of toluene, and is divided into portions. To these portions are added portions of a 10% by weight solution of a 90:10 vinylidene chloride:acrylonitrile copolymer in tetrahydrofurane, in amounts shown in the table below.

The resulting solutions are applied to coating-receptive (surface-oxidized) polypropylene film by dipping strips of the film into the solutions, draining, and drying the strips for 30 seconds at 100° C. The heat sealing properties of the film are determined by the method of Example 1. Results are as follows:

| Run No. | Resin:copol. weight ratio [1] | Heat seal test grams/inch |
|---|---|---|
| 1 | 0:100 | 310 |
| 2 | 5:95 | 600 |
| 3 | 10:90 | 990 |
| 4 | 15:85 | 1,200 |
| 5 | 20:80 | 1,600 |
| 6 | 25:75 | 1,800 |
| 7 | 33:67 | 1,880 |
| 8 | 50:50 | 1,350 |

[1] Polyol-poly(methoxymethyl)amidogen resin:vinylidene chloride acrylonitrile copolymer weight ratio.

The results indicate that best heat seal values are obtained when the weight ratio of the resin to the copolymer is about 1:2.

Example 6

The following illustrates the comparative effectiveness of composition IV [polyol D—hexakis(methoxymethyl)-melamine-mixture] as tiecoat for heat-sealing topcoat material.

Coating-receptive (surface-oxidized) polypropylene film similar to that of Example 1 is coated with a 10% by weight toluene solution of composition IV, and the film is dried 3 minutes at 100° C., by the method of Example 1. There is then applied a solution (or emulsion) of a vinylidene chloride-acrylonitrile copolymer as topcoat, as shown in the table below, and the resulting film is dried at 100° C. The heat sealing properties of the film are then determined by the method of Example 1.

Results are as follows:

| Run No. | Topcoat | | | Heat seal test grams/inch | |
|---|---|---|---|---|---|
| | VC:AN ratio [1] | Percent copol. [2] | Solvent [3] | No tiecoat | With tiecoat |
| 1 | 90:10 | 10 | THF | 300 | 800 |
| 2 | 85:15 | 10 | MEK | 150 | 700 |
| 3 | 90:10 | 10 | Water [4] | 10 | 260 |

[1] Weight ratio of vinylidene chloride to acrylonitrile in topcoat.
[2] In solution (runs 1 and 2) or in emulsion (run 3).
[3] THF=tetrahydrofuran; MEK=methyl ethyl ketone.
[4] Continuous phase of emulsion.

Example 7

The following illustrates the affinity of tie-coated polyethylene film of the present invention for other topcoat material. The film used is coating-receptive, surface-oxidized polypropylene film tiecoated by the method of Example 1. A U.S. postage stamp (wetted by salvia) is "pasted" on one portion of the film, and another portion is topcoated with the nitrocellulose lacquer used for waterproofing regenerated cellulose film. Both materials are strongly adherent to the film.

Example 8

Compositions VI–X are applied to coating-receptive (surface oxidized) polypropylene film as tiecoats, the tiecoats are dried and the resulting films are topcoated with Saran, all by the method shown in run 1 of Example 1–A.

The products are rated "O.K." when tested by the adhesive tape stripping test of Example 1.

Example 9

Composition XI at 10% solids by weight is coated on coating-receptive (surface oxidized) polypropylene film with a No. 3 Mayer rod and the film is dried for 1 minute at 100° C.

The film is coated with a 15% by weight solution of a 90:10 vinylidene chloride:acrylonitrile copolymer in tetrahydrofurane and drying the film for 2 minutes at 100° C.

The topcoat cannot be stripped from the film by the adhesive cellulose tape ("Scotch" tape) test of Example 1.

Example 10

The following illustrates the comparative effectiveness of a preferred polyol-amidogen composition (composition XII) as tiecoat on a number of hydrophobic organic films having a reacted content of chlorine, nitrogen or oxygen.

The procedure of Example 1–A is repeated, except that the anchor coating composition of Example 1–A is replaced by composition XII, and the topcoat is a 92:4:4 weight percent vinylidene chloride:acrylonitrile:methacrylate ester copolymer applied at a 50% by weight latex in water. The film has a heat-seal value of 500 g./inch.

Example 11

Coating-receptive (surface-oxidized) polypropylene film is coated with the solution of composition XIII and the film is dried for 1 minute at 100° C. To this anchor-coated film is then applied the latex of Example 10 as topcoat and the film is dried in like manner. The adhesion of the topcoat to the anchor-coated film is very good.

Example 12

The following illustrates the topcoating of coating-receptive hydrophobic organic film, the topcoat being anchored to the substrate film by the action of a polyol-poly(alkoxymethyl)amidogen resin according to the present invention.

Polyvinylidene chloride film approximately 0.05 ml. in thickness supported on a terephthalate-glycol film is provided with a surface coating of an anchor agent by treatment with composition I, applied by use of a No. 150 screen engraved cylinder in a full scale production machine. The polyvinylidene chloride surface of the film laminate is continuously coated as described and the coating is dried and the resin thermoset by passage of the film through a hot air oven having a temperature of 225° F. The film on emerging from the oven is topcoated by a hot extrusion application of polyethylene to give a topcoat thickness of 1 to 2 mils. The hot film is rapidly cooled by passage between cold rolls having a temperature of 15° F.

Example 13

Compositions XIV and XV are applied to coating-receptive (surface-oxidized) polypropylene film as tiecoats and the resulting film, the tiecoats are dried and cured, and the resulting films are topcoated with Saran, all by the method shown in Example 1–A (run 1). The products are rated "O.K." when tested by the adhesive tape stripping test of Example 1.

We claim:

1. Hydrophobic organic film carrying a coating adhering directly thereto of an at least partially thermoset polyol-polymethylol-amidogen condensation product, said coating being a condensation product of a polyol having a molecular weight in excess of 2,000 with a material selected from the group consisting of the polymethylol-amidogens and lower alkyl ethers thereof, the ratio of the number of hydroxyl substituents of the polyol to the sum of the hydroxyl substituents and etherified hydroxyl substituents of the amidogen being between 1:0.5 and 1:5 and the polyol being a member of the group consisting of starch, hydroxyethyl cellulose, hydroxyl-containing alkyd resins and copolymers of lower hydroxyalkyl acrylates with vinyl monomers copolymerizable therewith.

2. The coated hydrophobic organic film of claim 1 wherein said film is a polyolefin.

3. The coated hydrophobic organic film of claim 1 wherein said film is a nylon.

4. The coated hydrophobic organic film of claim 1 wherein said film is a polyvinylidene chloride.

5. The coated hydrophobic organic film of claim 1 wherein said film is a polyethylene terephthalate.

6. The coated hydrophobic organic film of claim 1 wherein said film is a polyvinyl alcohol.

7. Film according to claim 1 wherein the coating is of tiecoat thickness.

8. Film according to claim 1 wherein the coating is of topcoat thickness.

9. Film according to claim 1 wherein the coating comprises a non-tacky predominantly polyvinylidene chloride copolymer as agent inhibiting diffusion of oxygen through said coating.

10. Film according to claim 1 wherein the polyol is a polyhydroxy alkyd resin.

11. Film according to claim 10 wherein the coating is a condensation product of a water-insoluble polyhydroxy alkyd resin having a molecular weight between about 3,000 and 6,000 containing about six hydroxy substituents per molecule and hexakis(methoxymethyl)melamine.

12. Film according to claim 10 wherein the coating is a condensation product of a water-insoluble polyhydroxy alkyd resin having a molecular weight between about 3,000 and 6,000 and containing about 3 hydroxyl substituents per molecule and di(methoxymethyl)urea.

13. Film according to claim 10 wherein the coating is a condensation product of about 9 parts by weight of a tetrahydrophthalic anhydride-adipic acid-neopentyl glycol-trimethylol ethane condensate having an acid number of about 6 with 1 part by weight of hexakis(methoxymethyl)melamine.

14. Film according to claim 10 wherein the coating condensation product of about 4 parts by weight of a polyhydroxy tetrahydrophthalic anhydride-dimerized linoleic acid-1,5-pentane-diol-trimethylolethane condensate having an acid number of about 5 and 1 part by weight of tris(methoxymethyl)melamine.

15. Film according to claim 1 wherein the coating is a condensation product of a polyhydroxy water-soluble tetrahydrophthalic anhydride-adipic acid-neopentyl glycol-trimethylolethane resin and hexakis(methoxymethyl)melamine, the number of methoxymethyl groups in said melamine being between 1 and 2 times the number of hydroxy groups in said polyol.

16. Film according to claim 1 wherein the polyol is a polyhydroxyvinyl polymer which comprises 1–25 mol percent of a lower (hydroxyalkyl) acrylate.

17. Film according to claim 16 wherein the coating is a condensation product of 80 parts by weight of a 1:2–4:4–8 molar ratio 2-hydroxyethyl methacrylate:styrene:ethyl acrylate copolymer with 10 to 20 parts of hexakis(methoxymethyl)melamine.

18. Film according to claim 1 carrying over said resin a topcoat of hydrophobic organic material.

19. Film according to claim 18 wherein the topcoat is nitrocellulose lacquer.

20. Film according to claim 18 having a topcoat of a non-tacky polyvinylidene chloride copolymer.

21. Film according to claim 18 wherein the topcoat is a polyolefin.

22. Process for coating a hydrophobic organic film, which comprises coating said film with a fluid liquid dispersion of a mixture of a polyol having a molecular weight in excess of 2,000 and being a member of the group consisting of starch, hydroxyethyl cellulose, hydroxyl-containing alkyd resins and copolymers of lower hydroxyalkyl acrylates with vinyl monomers copolymerizable therewith, a material selected from the group consisting of polymethylol amidogens and lower alkyl ethers thereof, and an acid catalyst for accelerating reaction between the polyol and the amidogen, the ratio of the total number of the hydroxyl groups in said polyol to the total number of hydroxyl and alkoxymethyl groups in said amidogen being between 1:0.5 and 1:5, and heating said film at a temperature above 50° C. until said polyol has reacted with said amidogen.

23. A process according to claim 22 wherein the heating is terminated before the amidogen has completely reacted with the polyol.

References Cited

UNITED STATES PATENTS

| | | | |
|---|---|---|---|
| 2,728,688 | 12/1955 | Wellish | 117—76 |
| 2,879,236 | 3/1959 | Yundt et al. | 117—161 X |
| 2,987,418 | 6/1961 | Wooding | 117—161 X |
| 3,020,255 | 2/1962 | Magrane et al. | 260—850 |
| 3,091,612 | 5/1963 | Stephens | 260—850 X |
| 3,133,032 | 5/1964 | Jen et al. | 260—850 X |
| 3,211,579 | 10/1965 | Reiter | 117—161 X |
| 3,228,792 | 1/1966 | Nyquist | 117—161 X |
| 3,242,119 | 3/1966 | Ott et al. | 260—850 |
| 3,294,577 | 12/1966 | Mayer | 117—138.8 |
| 3,298,987 | 1/1967 | Colgan et al. | 117—161 X |

WILLIAM D. MARTIN, *Primary Examiner.*

R. HUSACK, *Assistant Examiner.*

U.S. Cl. X.R.

117—71, 76, 84, 122, 138.8, 161; 260—17.3, 850, 851

UNITED STATES PATENT OFFICE
CERTIFICATE OF CORRECTION

Patent No. 3,428,478                                        February 18, 1969

Malcolm Macfarland Donaldson et al.

It is certified that error appears in the above identified patent and that said Letters Patent are hereby corrected as shown below:

Column 3, line 57, "vary" should read -- very --. Column 4, line 44, "water-soluble" should read -- water-insoluble --; same column 4, line 68, column 5, line 8, column 12, line 42 and column 13, line 26, "Saran", each occurrence, should read -- saran --.

Signed and sealed this 31st day of March 1970.

(SEAL)
Attest:

Edward M. Fletcher, Jr.                                WILLIAM E. SCHUYLER, JR.

Attesting Officer                                            Commissioner of Patents